(12) United States Patent
Veillette et al.

(10) Patent No.: US 7,797,137 B2
(45) Date of Patent: Sep. 14, 2010

(54) ADAPTIVE METHOD AND SYSTEM OF MONITORING SIGNALS FOR DETECTING ANOMALIES

(75) Inventors: Michel Veillette, St-Bruno (CA); Said Berriah, Laval (CA); Gilles Tremblay, Montreal (CA)

(73) Assignee: Recherche 2000 Inc., Montreal (CA)

( * ) Notice: Subject to any disclaimer, the term of this patent is extended or adjusted under 35 U.S.C. 154(b) by 763 days.

(21) Appl. No.: 11/671,194

(22) Filed: Feb. 5, 2007

(65) Prior Publication Data
US 2007/0208519 A1 Sep. 6, 2007

Related U.S. Application Data

(60) Provisional application No. 60/764,794, filed on Feb. 3, 2006.

(51) Int. Cl.
G06F 11/00 (2006.01)
G06F 17/00 (2006.01)
(52) U.S. Cl. .............. 702/189; 702/185; 702/193; 205/81
(58) Field of Classification Search ............... 702/189, 702/185, 193
See application file for complete search history.

(56) References Cited

U.S. PATENT DOCUMENTS

| | | | |
|---|---|---|---|
| 5,680,409 A | 10/1997 | Qin et al. | |
| 5,774,379 A * | 6/1998 | Gross et al. | 702/72 |
| 6,266,436 B1 | 7/2001 | Bett et al. | |
| 6,553,324 B2 | 4/2003 | Langmeier et al. | |
| 6,553,334 B2 * | 4/2003 | Gross et al. | 702/183 |
| 2001/0039481 A1 * | 11/2001 | Tremblay et al. | 702/35 |
| 2004/0158432 A1 * | 8/2004 | King et al. | 702/183 |
| 2005/0018747 A1 * | 1/2005 | Takehara | 374/45 |

FOREIGN PATENT DOCUMENTS

EP 0513457 11/1992

OTHER PUBLICATIONS

PCT International Search Report, Form PCT/ISA/210 pp. 1-4, May 23, 2007.

\* cited by examiner

Primary Examiner—Hal D Wachsman
(74) Attorney, Agent, or Firm—Ogilvy Renault LLP

(57) ABSTRACT

There is described a method for detecting anomalies in a set of signals that normally exhibit analogous behaviour. The method comprises: acquiring a set of signals from at least one measurement source; designating a reference signal $S_{ref}$ from the acquired set of signals; computing a deviation $Dev_i$ between the reference signal $S_{ref}$ at a reference point in time $t_{ref}$ ($S_{ref}(t_{ref})$) and at least one of the acquired signals $S_i$ over time; and generating a deviation alarm trigger when the deviation meets a given deviation criteria.

22 Claims, 6 Drawing Sheets

ADAPTIVE METHOD AND SYSTEM OF MONITORING SIGNALS FOR DETECTING ANOMALIES

CROSS-REFERENCE TO RELATED APPLICATIONS

This application claims priority under 35 US §119(e) of US provisional patent application 60/764,794, filed on Feb. 3, 2006 and entitled Monitoring System and Method for Building Predictive Models and Detecting Anomalies, the specification of which is hereby incorporated by reference.

FIELD

The present description relates to methods and systems for diagnosing and profiling any industrial process based on state-of-the-art data analysis methods.

BACKGROUND

An electrolyzer is defined as an apparatus in which an electrolysis reaction takes place. Electrolysis is the process of decomposing a chemical compound into its elements or producing a new compound by the action of an electrical current. Basically, an electrolyzer is composed of two electrodes and a separator, called a membrane. Electrolyzers are commonly encountered in the chlor-alkali industry, in chlorate production plants, and in fuel cells. In the chlor-alkali industry, primary products of electrolysis are chlorine gas, hydrogen gas, and sodium hydroxide solution (commonly called "caustic soda" or simply "caustic"). Most electrolyzers are of the membrane cell type, but recently, new technologies such as G.D.E cells (Gas Diffusion Electrode) are being used in industrial settings for caustic soda and chlorine production. In the chlorate industry, sodium chlorate or sodium hypochlorite is produced from the electro-generated chlorine and caustic soda with no separator in the electrolysis cell. Analogously, in fuel cells, water is electrolyzed to produce hydrogen gas.

FIG. 1 is an illustration of a typical prior art membrane cell used in the chlor-alkali industry. It is composed of two compartments. The anode compartment is provided with a saturated brine solution (NaCl), while a dilute caustic soda passes through the cathode compartment. In chlor-alkali plants, chlorine gas ($Cl_2$) evolves at the Titanium-coated anode 2. The combination of hydroxide ions ($OH^-$) with migrated sodium ions($Na^+$) across the selective membrane 1 generates caustic soda (NaOH) and hydrogen gas ($H_2$). The cathode 3 is usually nickel with a catalytic coating to reduce the over potential for $H_2$ evolution. The complete chlor-alkali process is described by the following equation:

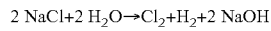

2 NaCl+2 $H_2O \rightarrow Cl_2 + H_2 +$ 2 NaOH

Usually an electrolyzer is a combination of elementary membrane cells. Since the electrolysis process takes place in each cell after applying a current, energy consumption plays a key role in the process. The electrolyzer overall performance therefore is mainly related to cell efficiency. According to principles well known in the art, and described in literature such as "A First course in Electrode Processes" by Derek Pletcher, or in "Ion Permeable Membranes", by Thomas A. Davis, J. David Genders and Derek Pletcher, voltage variations in the membrane cell are generally a result of physical changes within the cell components. The cell voltage variation is distributed between its components: anode, cathode, membrane and electrical connections. An abnormal decrease or increase in the cell voltage is generally considered as a source of potential problems.

It is therefore desirable to be able to monitor and characterize an electrolyzer's cell efficiency.

Commonly, when monitoring a process, measurement systems provide ways to define alarm thresholds for each of the monitored values. With this approach, it is often difficult to set the best threshold, since a fixed threshold does not take into account the changing context of the process. For instance, in an electrolyzer, the individual cell voltage will vary proportionally to the load of the system. At low load, reaching the threshold value will represent a much higher risk than the same level at a higher load.

Therefore, when setting a low level threshold with no external information, it is difficult to decipher if the anomaly arises at the process level or at the low production level.

Measurement sensors usually perform their readings assuming that their values are independent from the others. Often this is not the case. Several measurements depend on common process parameters.

Some approaches try to improve these shortcomings by linking measured signal values with external elements to combine the information and provide adjustments. Here again, there are some drawbacks since external values cannot be taken to the level at which efficiency is best. Usually, additional components or distant processes are needed to perform the adjustments which leads to deferring the action and more breaking modes are possible.

Additionally, it is sometimes difficult to synchronize signal values originating from different sources. Precision is lost which in turn affects the detection process.

SUMMARY

Accordingly, the present description presents a new approach to monitor data and detect deviant or abnormal behavior within a set of data signals that are anticipated to have similar behavioral characteristics.

According to a first broad aspect, there is provided a method for monitoring and detecting anomalies at the cell level in an electrolyzer.

According to another broad aspect, there is provided an autonomous monitoring system of cell function in an electrolyzer.

According to yet another broad aspect, there is provided a method for characterizing electrode elements of cells in an electrolyzer.

According to yet another broad aspect, there is provided a method for detecting anomalies in a set of signals that normally exhibit analogous behaviour. The method comprises: acquiring a set of signals from at least one measurement source; designating a reference signal $S_{ref}$ from the acquired set of signals; computing a deviation $Dev_i$ between the reference signal $S_{ref}$ at a reference point in time $t_{ref}(S_{ref}(t_{ref}))$ and at least one of the acquired signals $S_i$ over time; and generating a deviation alarm trigger when the deviation meets a given deviation criteria.

According to another aspect, there is provided a system for detecting anomalies in a set of signals that normally exhibit analogous behaviour. The system comprising: a signal measurement module for acquiring a set of signals from at least one measurement source and designating a reference signal $S_{ref}$ from the acquired set of signals; a deviation computing module for computing a deviation $Dev_i$ between the reference signal $S_{ref}$ at a reference point in time $t_{ref}(S_{ref}(t_{ref}))$ and at least one of the acquired signals $S_i$ over time; and an anomaly detector for generating a deviation alarm trigger when the deviation meets a given deviation criteria.

BRIEF DESCRIPTION OF THE DRAWINGS

These and other features and aspects will become better understood with regard to the following description and accompanying drawings wherein.

DETAILED DESCRIPTION OF THE PREFERRED EMBODIMENT

The method presented herein allows detecting anomalies in behavioral function from a set of data signals that normally exhibit analogous behavior.

Figure 6:
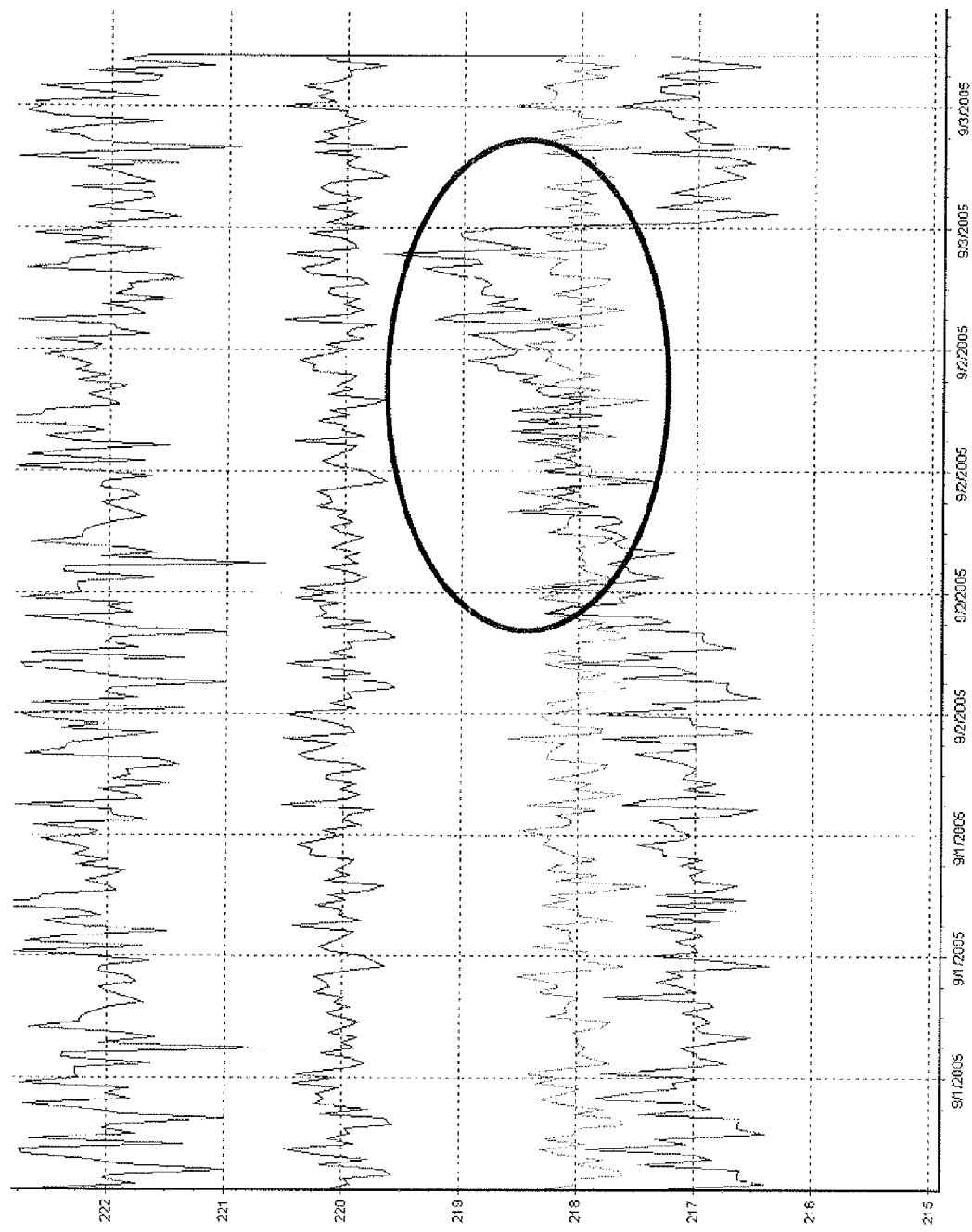
FIG. 6 is a screen shot of data signals that are anticipated to have similar behavioral characteristics, with a deviating signal.

This would be expected when data signals are influenced by common parameters or a common environment. A signal is defined herein as a series of discrete values transmitted over time form a single source. More specifically, a signal can originate from the measurement of process parameters over time, such as the temperature measurement of a liquid, the individual voltage measurement for a cell of an electrolyzer, etc. A variation detected on one signal should be mirrored on all signals of common origin and any discrepancy from this variation is indicative of a specific change in the normal behavior that warrants notification. Such a deviating signal is illustrated in FIG. 6.

The method presented herein involves comparing sets of signals that possess analogous behavior. The method proceeds by designating a reference signal and linking the calculation with this reference element. The simplicity of this approach allows for the embedding of the algorithm in small processors, such as sensor systems for monitoring processes.

Figure 1:
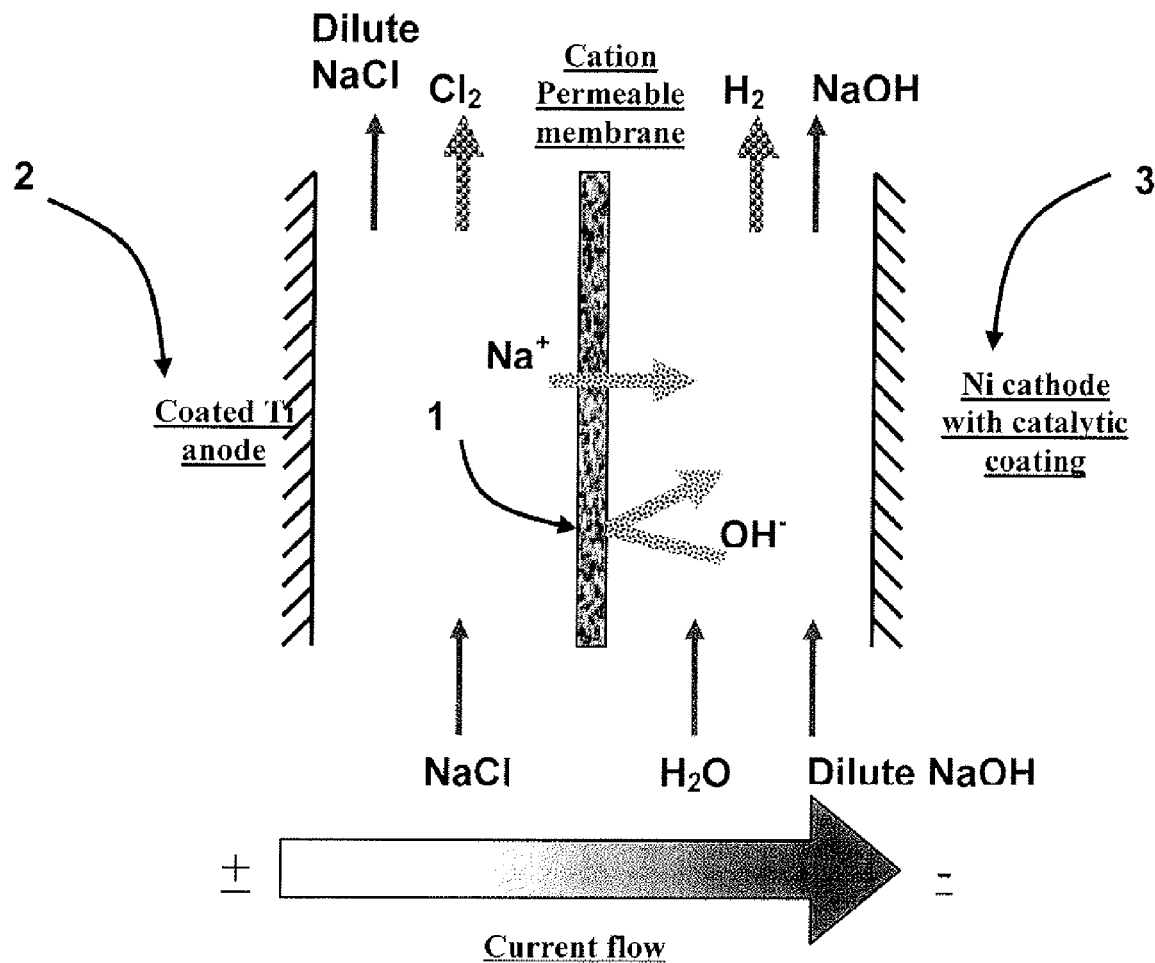
FIG. 1 is a typical prior art membrane cell used in the chlor-alkali industry.
Figure 2:
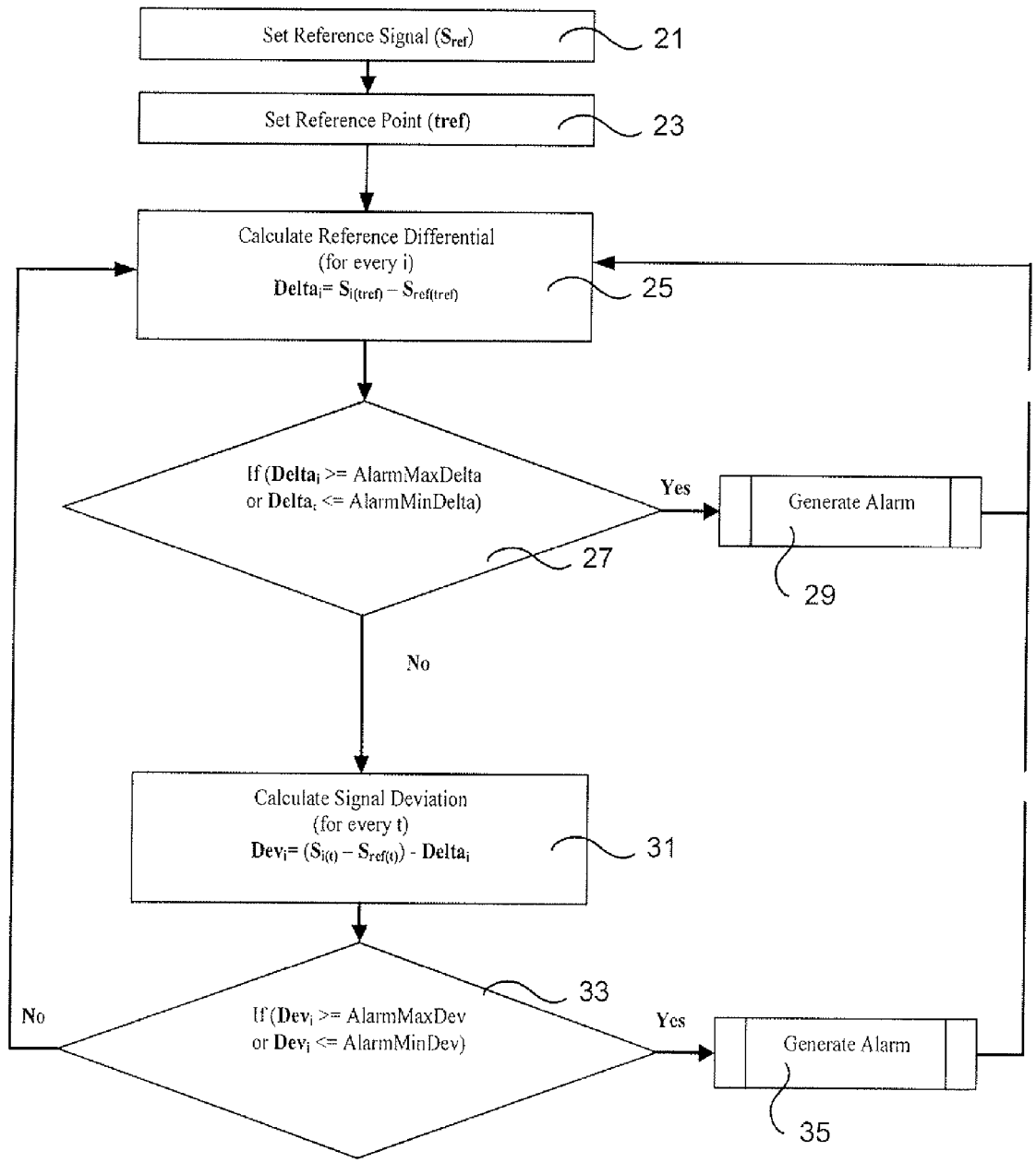
FIG. 2 is a flow chart of a method for detecting an anomaly using a reference signal according to a first embodiment.

Turning to FIG. 2, which is a flow chart of a method of detecting an anomaly, i signals, with values taken at time t, are considered. Each value is designated with the notation Si(t). According to the embodiment of FIG. 2, in a first step 21, a reference signal $S_{ref}$ is set and in step 23, a reference point in time $t_{ref}$ is set. In step 25, for each signal i, the value of the signal $S_i$ at the reference point in time $S_i(t_{ref})$, is compared with the value of the reference signal $S_{ref}$ at the reference point in time $S_{ref}(t_{ref})$. In step 27, the difference (Delta$_i$) between the values is compared to maximum and minimum delta threshold values. If Delta$_i$ is out of bounds with respect to the acceptable threshold values (i.e., a given delta criteria is met), an alarm or alarm trigger is generated, as per step 29. An alarm can take the form of a value switch in a status tag that triggers a User Interface (UI) (e.g., play a sound, show or modify an image, show advisory text), an event database, a relay trigger. It is also contemplated that the alarm trigger may be used to shut down the industrial process (manually or automatically). If Delta$_i$ is within bounds, for every t, a signal deviation is calculated, as shown in step 31 and according to the formula:

$$Dev_i = (S_i(t) - S_{ref}(t) - Delta_i)$$

If the signal deviation value calculated in step 31 is out of bounds with respect to minimum and maximum deviation threshold values (i.e., a given deviation criteria is met), an alarm is generated, as per step 35.

A return to step 25 is performed at each t interval, i.e. when a new value (a new point) is obtained for each signal.

Under normal behavior, the calculated values for $Dev_i$ should follow a standard distribution, centered at 0. A deviation from this distribution may be indicative of a problem or unexpected behavior.

The monitoring of the $Dev_i$ values is performed according to several criteria. For example, threshold values reached and exceeded, for a specified duration of time, changes in value distribution (mean, standard deviation, etc.) or the slope/curve fitting parameters of the $Dev_i$ evolution over time are all criteria for analysis of the $Dev_i$ values.

Figure 3:
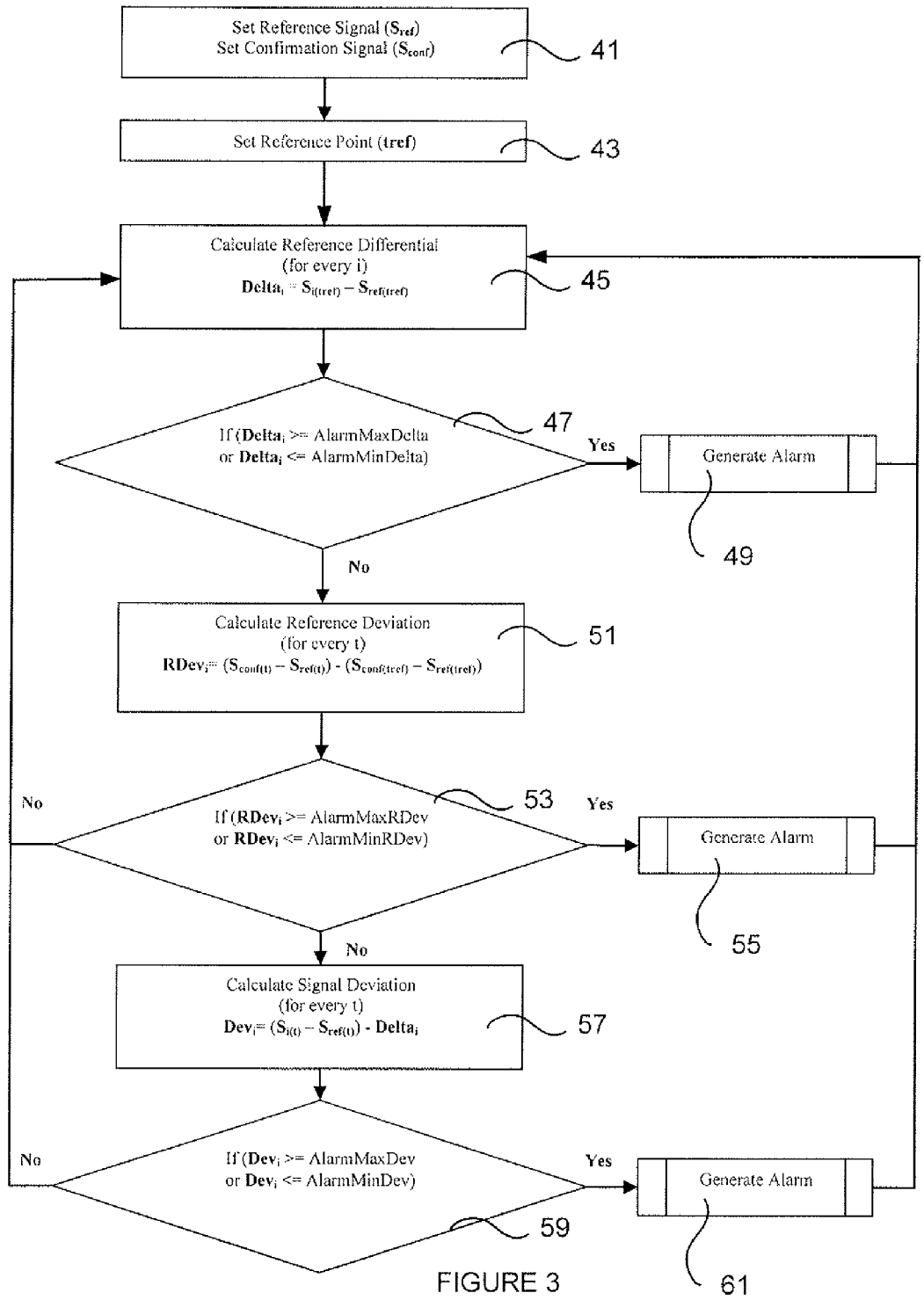
FIG. 3 is a flow chart of a method for detecting an anomaly using a reference signal and a confirmation signal according to a second embodiment.

The algorithm of FIG. 2 may vary and can be improved in several ways. Thus, the reference signal can be monitored to ensure it does not itself deviate by using another signal to confirm its behavior (signal confirmation). A modified algorithm using such a confirmation signal will be described with reference to FIG. 3.

In step 41, a reference signal $S_{ref}$ and a confirmation signal $S_{conf}$ are set, and in step 43 are reference point in time $t_{ref}$. In step 45, for every signal I, the reference differential Delta$_i$ is calculated. In step 47, if Delta$_i$ is out of bounds with respect to threshold minimum and maximum values, an alarm is generated, as per step 49.

The difference with respect to the embodiment of FIG. 2, is that in step 51, for every t, a reference deviation value is calculated, according to the formula:

$$RDev_i = (S_{conf}(t) - S_{ref}(t)) - (S_{conf}(t_{ref}) - S_{ref}(t_{ref}))$$

Then, in step 53, the value of the reference deviation $RDev_i$ is compared to minimum and maximum reference deviation threshold values. An alarm is generated, as per step 55, if the value of $RDev_i$ is out of bounds (i.e., a given confirmation criteria is met).

There is a return to step 45 at each t interval (when the confirmation criteria is not met), i.e, when a new value (a new point) is obtained for each signal.

In step 57, the signal deviation $Dev_i$ is calculated for every t and its value is compared with minimum and maximum thresholds in step 59. An alarm is generated, as per step 61, if the value of $Dev_i$ is out of bounds.

The method also returns to step 45 from step 59 when the deviation criteria is not met.

Setting of the reference signal and confirmation of the signal can be performed manually or automatically. To do it automatically, the signals that are best centered in the value distribution at the reference point can be chosen. Thus:

$S_{ref}$ is the one that satisfies Min(Abs (Mean($S_i(t_{ref})$)−$S_i(t_{ref})$)).

$S_{conf}$ is the one that satisfies Min(Abs ($S_{ref}(t_{ref})$−$S_i(t_{ref})$))

$S_{ref}(t)$ can also be a calculated value. For instance, at each time t, we can use the mean of the values, calculating $S_{ref}(t)$=Mean($S_i(t)$). This alternative avoids the use of signal confirmation, but requires a greater computational capacity.

The choice for a reference point $t_{ref}$ can change over time and can be automated, providing new reference differentials. Thus $t_{ref}$ may be set from an external action (such as a user trigger) or according to some contextual criteria/process operation condition (start up, load change, etc. of the industrial process). When the signal is continuous over time, setting a new reference point allows the monitoring process to adjust itself to the current working condition. The algorithm can rely on the reference signal to set a new $t_{ref}$. By doing so, there is no external value or action needed for the algorithm. For instance, when $S_{ref}(t)$ reaches a preset threshold, the current t becomes the new $t_{ref}$ and all the $Delta_i$ values are computed again.

The alarm monitoring feature can be activated or deactivated. It may be performed from an external action (such as a manual user trigger) or performed automatically based on specific criteria/process operation condition (start up, load change, etc. of the industrial process). It is possible to manage it in the algorithm, avoiding any external input. To do so, when $S_{ref}(t)$ is outside some prefixed limits, we set $Dev_i=0$.

When scale factors between signals are not the same, it is possible to bring the signal values $S_i(t)$ to the same level prior to the calculation process. Before performing any calculation, the signal values are adjusted with:

$$S_i\text{corr}(t)=S_i(t)*a_i+b_i$$

The above is a standard compensation equation involving a scale change and a translation. For example, if a signal is twice another one, the signal will need to be divided by 2 in order to perform a comparison. Using the formula above, $a_i$ would be 0.5 and $b_i$ would be 0.

This kind of transformation allows the linking of different signals in a given process, such as current and voltage.

All of the above-mentioned alarm generation thresholds can be set manually or automatically based on measured signals. For instance, the noise evaluation on the signals can be a criteria used to set a threshold.

Depending on the criterion that causes an alarm and depending on the process context, it is possible to establish a diagnostic of specific problems.

According to one aspect, the method and system presented herein allow characterizing the performance of an electrolyzer having elementary cells in the context of an industrial electrolysis process. More particularly, the description sets forth a method for characterizing an electrolyzer by comparing each elementary cell voltage to a reference cell and classifying its behaviour based on that comparison.

In the context of chlorine and chlorate production, when producing chlorine with a membrane cell electrolyzer, and when the signals are composed of the individual cell voltage readings of a stack assembly, by using one cell as a reference signal, the deviation of a single element will indicate a problem at the cell level.

According to an aspect of this method it is possible to embed the algorithm in an individual cell voltage measurement system to obtain an autonomous monitoring system which checks for deviations from normal behavior and which is not sensitive to changes in production parameters, as it relies only on measured signal values.

If computational power is available, more specific information on the alarm source may be provided, for a specific deviation. For example, when producing at a specific stable plateau, a momentary high deviation is the symptom of a bubble formed in the cell. As another example, during a startup period, a high continuous deviation, combined with a small or negative $Delta_i$ may be the symptom of a pinhole in a membrane. Similarly, a low deviation could be a symptom of a local temperature raise, possibly related to a low electrolyte level in the cell or a lower flow rate.

At startup, using the $Delta_i$ value and the overall slope of the $Dev_i$ values during the startup period, it is possible to characterize the electrode elements of each cell. For the same kind of electrolyzer, when the reference signal is the current, and by using scaling factors to compare it with the voltage data, the deviations can provide insight into the electrolyzer's overall condition and the control parameters of the process. For example, a low level deviation may indicate a problem with the temperature, while a high level deviation will indicate a problem with the caustic soda concentration, or a possible loss in membrane efficiency due to impurities in the brine.

A hardware implementation of the monitoring system described herein may be integrated in an autonomous voltage measurement system and may be used to monitor up to 96 individual voltage signal measurements.

A software implementation of the monitoring method presented herein allows the early detection of pinholes in membrane of the chlor-alkali process. By changing the reference point at different level of a startup, we can confirm the presence of a pinhole and its hazard potential. A negative $Delta_i$ and a positive $Dev_i$ will confirm a pinhole behavior. A first set of reference points are used to detect small pinholes. The following sets of reference point allow assessing the hazard potential.

Another software implementation of the monitoring method presented herein allows using signals originating from different sources. The software is integrated in our Intelligent Monitoring Unit (IMU) environment and is useful to detect deviations.

Figure 4:
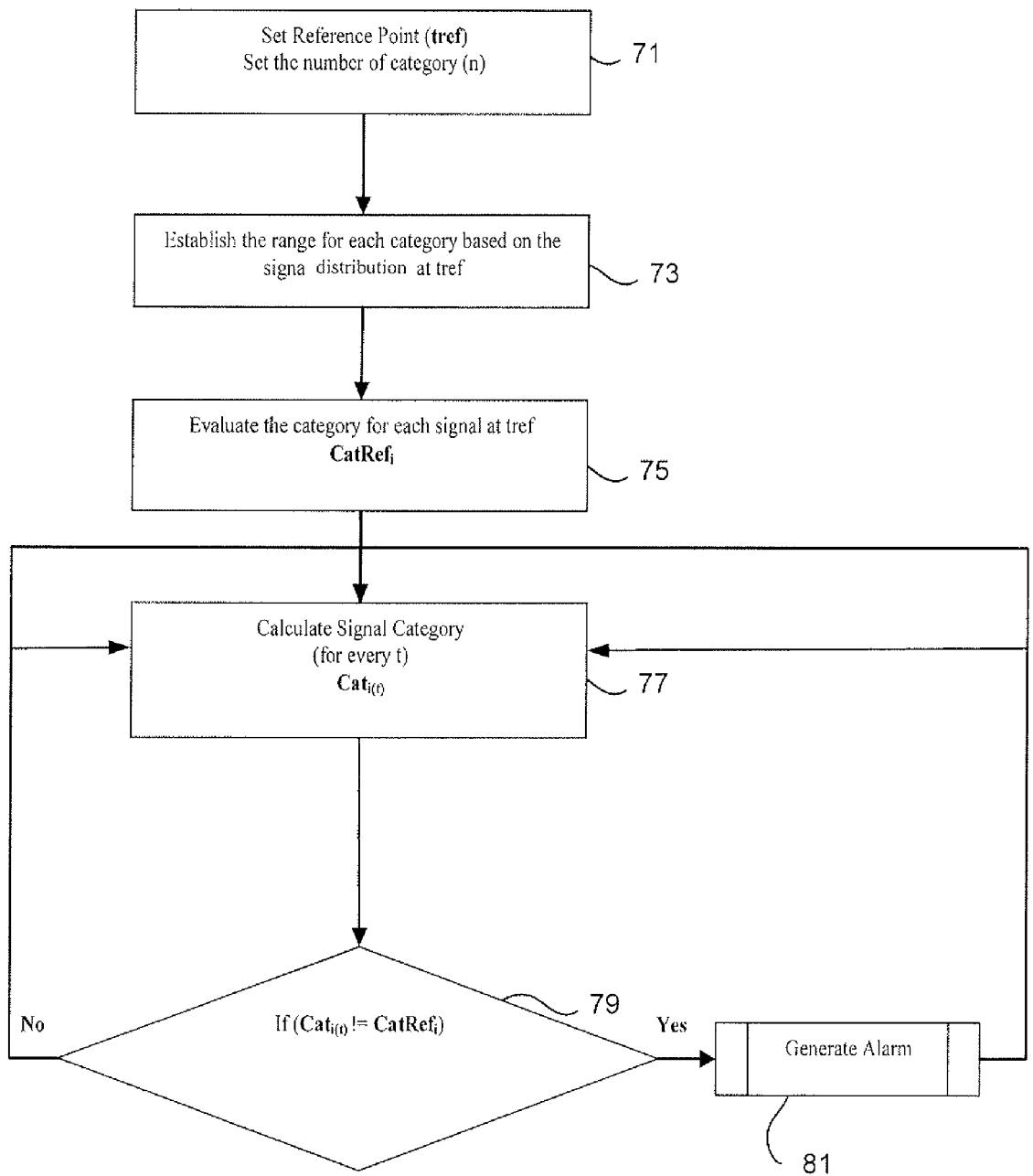
FIG. 4 is a flow chart of a method for detecting an anomaly according to a third embodiment.

As it will be apparent to one skilled in the art, various modifications are possible to the monitoring method without departing from the spirit and scope of the present description. As illustrated in FIG. 4, a variant of the method described earlier establishes a set of categories (or intervals) based on the distribution of the values of each signal at $t_{ref}$. A reference point $t_{ref}$ and a number of categories (n) are assigned in step 71. A range for each category based on the signal distribution at $t_{ref}$ is then established at step 73. Each signal is then assigned to one category ($CatRef_i$) at step 75. For each signal value at t, the method involves calculating the signal category for every time t (step 77) and checking that the signal still belongs to the same category (step 79). When it changes, it means that the behaviour has changed from normal operation and an alarm is generated (step 81). Comparing $Cat_i(t)$ and $Cat_{refi}$ is analogous to the calculation of deviation for each signal, at step 31 or step 55 of FIGS. 2 and 3, respectively. The result is a value centered at 0. Similar diagnostics to those described above can be performed.

Figure 5:
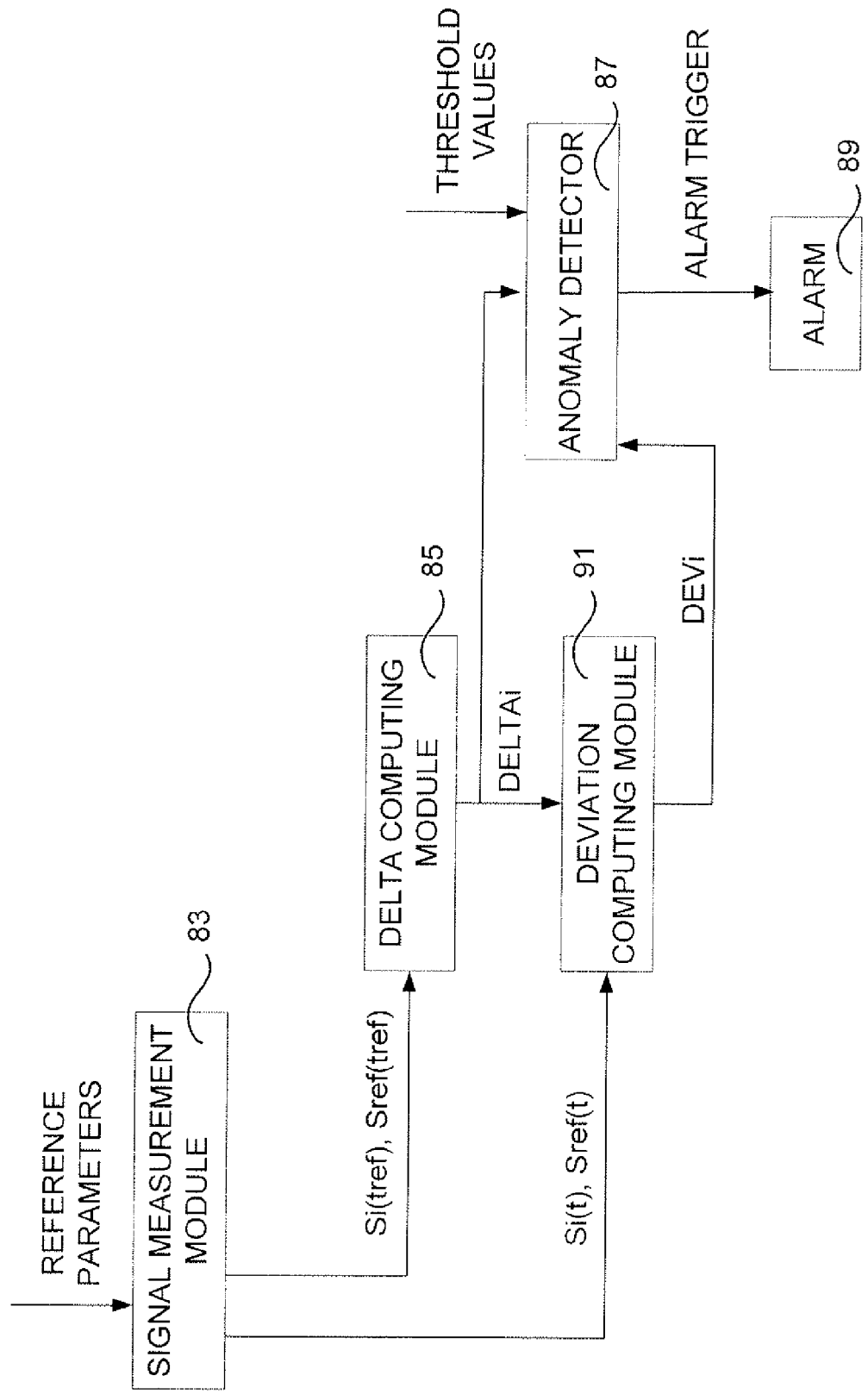
FIG. 5 is a block diagram of a system for detecting an anomaly according to an embodiment.

FIG. 5 illustrates a system for monitoring signals for detecting anomalies implementing a method such as that shown in FIG. 2. A signal measurement module 83 receives reference parameters, such as an indication of a reference point and a reference signal, and outputs the value of the signal $S_i$ at the reference point in time $S_i(t_{ref})$, as well as the value of the reference signal $S_{ref}$ at the reference point in time $S_{ref}(t_{ref})$. The values are received by a delta computing module 85 for comparison and for outputting of a $Delta_i$ value for each signal $S_i$. The signal measurement module 83 also outputs the values of all signals $S_i$ and $S_{ref}$ at every time interval. The deviation computing module 91 receives these values and the value of each $Delta_i$ and computes a $Dev_i$ value for each signal $S_i$. An anomaly detector module 87 receives threshold values for the values of $Delta_i$ and $Dev_i$ and checks whether the $Delta_i$ and $Dev_i$ values received are within bounds. An alarm module 89 (optional) may be triggered upon detection of an anomaly.

While illustrated in the block diagrams as groups of discrete components communicating with each other via distinct data signal connections, it will be understood by those skilled in the art that the preferred embodiments are provided by a combination of hardware and software components, with some components being implemented by a given function or operation of a hardware or software system, and many of the data paths illustrated being implemented by data communication within a computer application or operating system. The structure illustrated is thus provided for efficiency of teaching the present preferred embodiment.

It should be noted that the present invention can be carried out as a method, can be embodied in a system, a computer readable medium or an electrical or electro-magnetic signal.

The embodiments of the invention described above are intended to be exemplary only. The scope of the invention is therefore intended to be limited solely by the scope of the appended claims.

The invention claimed is:

1. A method for detecting anomalies in a set of signals that normally exhibit analogous behaviour, the method comprising:
   acquiring a set of signals $S_i$ from at least one measurement source, the set of signals $S_i$ exhibiting the analogous behaviour;
   arbitrarily selecting one of the signals $S_i$ to be designated as a reference signal $S_{ref}$, and designating a reference point in time $t_{ref}$;
   comparing each signal $S_i$ with a value of the reference signal $S_{ref}$ at the reference point in time $t_{ref}$;
   computing a deviation $Dev_i$ between the reference signal $S_{ref}$ at the reference point in time $t_{ref}$ and each one of the acquired signals $S_i$; and
   generating a deviation alarm trigger when the deviation $Dev_i$ meets a given deviation criteria, whereby a variation of one signal $S_i$ from $S_{ref}$ beyond the given deviation criteria is indicative of the anomalies, given the analogous behaviour of the set of signals $S_1$.

2. The method according to claim 1, wherein the deviation criteria comprises one of: a reached or exceeded threshold value for a specified duration of time; changes in value distribution, the value distribution comprising at least one of mean and standard deviation; and evolution of the slope/curve fitting parameters of the $Dev_i$ over time.

3. The method according to claim 1, wherein a signal from the set of signals is defined as a series of discrete values transmitted over time from the at least one measurement source, the discrete values being representative of process parameters over time.

4. The method according to claim 3, wherein said process parameters comprise at least one of voltage, temperature, and pressure.

5. The method according to claim 1, further comprising calculating a difference $Delta_i$ between at least one of the acquired signals $S_i$ at the reference point in time $t_{ref}$ and the reference signal $S_{ref}$ at the reference point in time $t_{ref}$, hence expressed as follows: $Delta_{i=Si}(t_{ref})-S_{ref}(t_{ref})$.

6. The method according to claim 5, further comprising comparing the difference $Delta_i$ to a given delta criteria; and generating a delta alarm trigger when the given delta criteria is met.

7. The method according to claim 6, wherein when the given delta criteria is not met, performing the deviation computing ($Dev_i$) at time t by subtracting, from at least one of the acquired signals at time t ($S_i(t)$), the reference signal $S_{ref}$ at time t ($S_{ref(t)}$) and the difference $Delta_i$, hence expressed as follows:

$$Dev_i=(S_i(t)-S_{ref}(t)-Delta_i).$$

8. The method according to claim 7, wherein the deviation criteria comprises one of: a reached or exceeded threshold value for a specified duration of time; changes in value distribution, the value distribution comprising at least one of mean and standard deviation; and evolution of the slope/curve fitting parameters of the $Dev_i$ over time.

9. The method according to claim 1, further comprising designating a confirmation signal $S_{conf}$ from the acquired set of signals for monitoring the behaviour of the reference signal $S_{ref}$.

10. The method according to claim 9, further comprising calculating a reference deviation $RDev_i$ as follows:

$$RDev_i=(S_{conf}(t)-S_{ref}(t))-(S_{conf}(t_{ref})-S_{ref}(t_{ref}));$$

where $S_{conf}(t)$ is the confirmation signal at time t, $S_{ref}(t)$ is the reference signal at time t, $(S_{conf}(t_{ref})$ is the confirmation signal at time $t_{ref}$, and $S_{ref}(t_{ref})$ is the reference signal at time $t_{ref}$.

11. The method according to claim 10, further comprising comparing the reference deviation $RDev_i$ to a given confirmation criteria; and generating a confirmation alarm trigger when the given confirmation criteria is met.

12. The method according to claim 11, further comprising activating and deactivating any one of the deviation alarm trigger, a delta alarm trigger and the confirmation alarm trigger according to any one of an external action, and a process operation condition.

13. The method according to claim 12, further comprising using any one of the deviation alarm trigger, delta alarm trigger and confirmation alarm trigger to perform at least one of shutting down an industrial process, characterizing the performance of an electrolyzer having elementary cells in the context of an industrial electrolysis process, and detecting pinholes in cell membranes for an electrolysis chlor-alkali process.

14. The method according to claim 11, further comprising manually or automatically setting any one of the deviation alarm criteria, a delta alarm criteria and the confirmation alarm criteria based on the shape of measured signals.

15. The method according to claim 10, further comprising automatically determining at least one of the reference or confirmation signals by choosing the best centered values in the set of signals at the reference point in time $t_{ref}$.

16. The method according to claim 10, further comprising setting the reference point in time $t_{ref}$ according to at least one of an external action, and a process operation condition.

17. The method according to claim 1, further comprising scaling the signals from the set of signals prior to their acquisition.

18. The method according to claim 1, further comprising integrating the steps of acquiring a set of signals, arbitrarily selecting one of the signals as a reference signal, computing a deviation, and generating a deviation alarm trigger in an autonomous voltage measurement system.

19. A system for detecting anomalies in a set of signals that normally exhibit analogous behaviour, the system comprising:
   a processor in a computer system; and
   a memory accessible by the processor, the memory comprising programming structures executable by the processor and configures for causing the processor to:

acquire a set of signals $S_i$ from at least one measurement source, the set of signals $S_i$ exhibiting the analogous behaviour;

arbitrarily select one of the signals $S_i$ to be designated as a reference signal $S_{ref}$, and designate a reference point in time $t_{ref}$;

compare each signal $S_i$ with a value of the reference signal $S_{ref}$ at the reference point in time $t_{ref}$;

compute a deviation $Dev_i$ between the reference signal $S_{ref}$ at the reference point in time $t_{ref}$ and each one of the acquired signals $S_i$; and generate a deviation alarm trigger when the deviation $Dev_i$ meets a given deviation criteria, whereby a variation of one signal $S_i$ from $S_{ref}$ beyond the given deviation criteria is indicative of the anomalies, given the analogous behaviour of the set of signals $S_i$.

20. The system according to claim 19, wherein the memory further comprises programming structures configured for causing the processor to calculate a difference $Delta_i$ between at least one of the acquired signals $S_i$ at a reference point in time $t_{ref}$ ($S_i(t_{ref})$) and the reference signal $S_{ref}$ at a reference point in time $t_{ref}$ ($S_{ref}(t_{ref})$), hence expressed as follows:

$$Delta_i = S_i(t_{ref}) - S_{ref}(t_{ref}).$$

21. The system according to claim 20, wherein the memory further comprises programming structures configured for causing the processor to compare the difference $Delta_i$ to a given delta criteria; and generate a delta alarm trigger when the given delta criteria is met.

22. The system according to claim 21, wherein said memory further comprises programming structures configured for causing the processor to first verify if the given delta criteria is met, if not, then perform the deviation computing ($Dev_i$) at time t by subtracting, from at least one of the acquired signals at time t ($S_i$)(t)), the reference signal $S_{ref}$ at time t ($S_{ref(t)}$) and the difference $Delta_i$, hence expressed as follows:

$$Dev_i = (S_i(t) - S_{ref}(t) - Delta_i).$$

* * * * *